US005 United States Patent Office 3,833,520
Patented Sept. 3, 1974

3,833,520
METHOD OF CONTROLLING MICROBIAL GROWTH IN POLYVINYL HALIDE RESIN COMPOSITIONS
George Tirpak, East Brunswick, and Robert J. Stanaback, Gladstone, N.J., assignors to Tenneco Chemicals, Inc.
No Drawing. Filed Jan. 5, 1973, Ser. No. 321,187
Int. Cl. C08f 19/14, 21/04
U.S. Cl. 260—23 XA     10 Claims

ABSTRACT OF THE DISCLOSURE

Resistance to attack by fungi and bacteria that is retained even after prolonged weathering is imparted to polyvinyl halide resin compositions by incorporating in them a biocidally-effective amount of a solution that contains from 1 to 3% of N-trichloromethylthiophthalimide in a polyalkylene glycol dibenzoate solvent.

---

This invention relates to a method of protecting polyvinyl halide resin compositions from attack by fungi, bacteria, and other microorganisms. More particularly, it relates to a method of preparing polyvinyl halide resin compositions that have excellent resistance to deterioration resulting from attack by microorganisms that is retained after prolonged weathering.

Polyvinyl halide resin compositions frequently contain as plasticizers, stabilizers, and lubricants materials that have their origin in animal or vegetable sources and that render the compositions susceptible to attack by fungi, bacteria, and other microorganisms. Microbiological deterioration of plasticized polyvinyl halide resin compositions may be manifested as surface growth which imparts an unattractive appearance to the product and/or as a change in the physical and mechanical properties of the compositions.

Plasticized polyvinyl halide resin compositions are often fabricated into films or molded products that are exposed to environmental conditions that are conductive to microbial growth. While such conditions may be encountered in both indoor and outdoor applications, the outdoor environment presents the greater opportunity for microbial growth on plasticized polyvinyl halide resin compositions. It is therefore desirable to incorporate into such compositions biocidal compounds that are resistant to weathering and that remain effective even after prolonged exposure to sunlight, heat, and rainfall.

A number of biocidal compounds have been used to protect polyvinyl halide resin compositions from attack by fungi, bacteria, and other microorganisms, but none has proven to be completely satisfactory for use in those applications in which the composition is subject to weathering. Some of the known biocides are insufficiently compatible with polyvinyl halides, and, when used in the amounts necessary to prevent microbial growth, they crystallize or bloom on the surface of the compositions thereby rendering them unfit for use. Other biocides are compatible with the resin and provide adequate protection against microbial attack, but they darken or otherwise deteriorate when they are subjected to heat during processing or to subsequent heating of the finished product. Some biocidal compounds including 10,10'-oxybisphenoxyarsine possess the required combination of compatibility, heat stability, and biocidal activity, but they rapidly lose their biocidal activity upon exposure to weathering conditions.

Among the biocidal compounds that are used commercially in plasticized polyvinyl halide resin compositions is N-trichloromethylthiophthalimide. This compound, whose preparation and use as a biocide were disclosed in U.S. Pat. No. 2,553,770 by A. R. Kittleson, is highly effective against a broad spectrum of fungi and bacteria, non-toxic and non-irritating at the levels commonly employed, and stable on exposure to heat and to light. There are, however, several disadvantages to the use of this compound that prevent its full scale utilization. Because it is marketed as a powder that has limited solubility in polyvinyl halide resins and in the commonly-used plasticizers, N-trichloromethylthiophthalimide has unsatisfactory handling characteristics, and it is difficult to distribute uniformly in the resinous compositions during compounding and processing steps. Of particular importance is the fact that its biocidal activity is of relatively short duration when the composition into which it has been incorporated is subjected to weathering conditions.

In accordance with this invention, it has been found that polyvinyl halide resin compositions that have excellent resistance to attack by microorganisms that is retained after prolonged weathering result when biocidal solutions that contain N-trichloromethylthiophthalimide in a polyalkylene glycol dibenzoate solvent are incorporated into the compositions. The biocidal solutions that are used to impart antimicrobial properties to the resinous compositions are convenient to handle and to store, and they are thoroughly compatible with polyvinyl halide resins and with the plasticizers, stabilizers, and other additives that are commonly used in polyvinyl halide resin compositions. They are readily and uniformly distributed throughout the resinous compositions during the conventional compounding procedures. Compositions that contain these biocidal solutions have better antimicrobial properties than do those that contain powdered N-trichloromethylthiophthalimide or other biocidal compounds when compared on the basis of equal content of active biocide, and they retain these properties longer when exposed to weathering.

The biocidal solutions of this invention contain about 1 percent to 3 percent, and preferably 1.5 percent to 2.5 percent, by weight of N-trichloromethylthiophthalimide in a polyalkylene glycol dibenzoate solvent. The useful solvents include trimethylene glycol dibenzoate, diethylene glycol dibenzoate, triethylene glycol dibenzoate, tetraethylene glycol dibenzoate, dipropylene glycol dibenzoate, tripropylene glycol dibenzoate, dibutylene glycol dibenzoate, the corresponding polyalkylene glycol esters of alkylbenzoic acids and chlorobenzoic acids, and mixtures thereof. The preferred solvents are diethylene glycol dibenzoate, dipropylene glycol dibenzoate, and mixtures thereof. It is particularly preferred to use as the solvent either diethylene glycol dibenzoate or mixtures that contain 10 percent to 90 percent of diethylene glycol dibenzoate and 10 percent to 90 percent of dipropylene glycol dibenzoate. The biocidal solutions that have the best combination of stability, biocidal activity, and resistance to weathering are those that contain about 2 pecent by weight of N-trichloromethylthiophthalimide dissolved either in diethylene glycol dibenzoate or in a mixture that contains approximately equal amounts of diethylene glycol dibenzoate and dipropylene glycol dibenzoate.

The biocidal compositions of this invention are readily prepared by heating the appropriate amounts of N-trichloromethylthiophthalimide and at least one polyalkylene glycol dibenzoate together at a temperature in the range of about 80° to 150° C., and preferably 100° to 110° C., until a clear solution is obtained. If desired, the solutions may be treated with diatomaceous earth and filtered before they are cooled. These solutions are stable and show very little or no precipitation of N-trichloromethylthiophthalimide after 6 months' storage at room temperature or at 6° C., after 24 hours' storage at —18° C., or after three or more freeze (—30° C.)—thaw (room temperature) cycles.

The amount of the biocidal solution that is incorporated into the polyvinyl halide resin composition is that which will provide sufficient N-trichloromethylthiophthalimide to control the growth of microoganisms. It is dependent upon such factors as the type of microorganism whose growth is to be controlled and the composition of the plasticizer system and its susceptibility to microbial attack. When only bacterial control is to be effected, an amount of the biocidal solution that will provide as little as 0.10 part of the biocidal compound per total plasticizer weight in the resinous composition can be used. For the protection of compositions containing plasticizer systems that are moderately susceptible to attack by fungi, for example, those that contain about 75 percent of dioctyl phthalate and 25 percent of dioctyl sebacate, the amount of the biocidal solution that is added is that which will provide about 0.25 to 0.50 part of the biocidal compound per total plasticizer weight. When the plasticizer system is one that is highly susceptible to micorbial attack, such as a mixture of about 25 percent of dioctyl phthalate and 75 percent of dioctyl sebacate, the amount of the biocidal solution that is incorporated in the composition is that which will provide about 0.50 to 0.75 part of N-trichloromethylthiophthalimide per total plasticizer weight. One part of more of the biocidal compound per 100 parts of plasticizer should be added when the plasticizer system is susceptible to microbial attack and the polyvinyl rein compositions are to be subjected to conditions that are highly conducive to such attack.

The plasticizers that are used in the polyvinyl resin compositions are those that are conventionally used in polyvinyl halide resinous compositions. They include a wide variety of monomeric and polymeric plasticizers. The preferred plasticizers are esters prepared by the reaction of a monohydric alcohol or a polyhydric alcohol having from 4 to 12 carbon atoms with phthalic anhydride, fatty acids, adipic acid, azelaic acid, sebacic acid, benzoic acid, citric acid, or other acids. Illustrative of these plasticizers are dibutyl phthalate, dihexyl phthalate, dicotyl phthalate, dinonyl phthalate, didodecyl phthalate, hexyl octyl phthalate, benzyl butyl phthalate, dibutyl sebacate, dioctyl sebacate, dihexyl adipate, dioctyl adipate, didecyl adipate, diisooctyl azelate, didodecyl azelate, acetyl tributyl citrate, butyl phthalyl butyl glycolate, and mixtures thereof. Also useful as plasticizers are tricresyl phosphate and other phosphate esters, chlorinated paraffins, and epoxidized vegetable oils. The polyalkylene glycol dibenzoates that serve as the solvents for N-trichloromethylthiophthalimide in the biocidal solutions of this invention are primary plasticizers for polyvinyl halide resins, and they may constitute all or a portion of the plasticizer system that is used in the resinous compositions. In most cases the plasticizer system contains about 10 percent to 40 percent by weight of polyalkylene glycol dibenzoate, which is added as the solvent in the biocidal solution.

The polyvinyl halide resins that are present in the compositions of this invention are the resinous products obtainde by the polymerization of a vinyl halide in the presence or absence of a copolymerizable monomer. The term "polyvinyl halide resin" as used herein includes vinyl halide homopolymers, such as polyvinyl chloride, polyvinyl bromide, and polyvinylidene chloride, as well as vinyl halide copolymers, including those formed by the polymerization of a vinyl halide with a comonomer, for example, vinyl esters such as vinyl acetate, vinyl propionate, vinyl butyrate, and vinyl chloroacetate; vinylidene chloride; vinyl alkyl sulfonates; vinyl ethers such as vinyl ethyl ether, vinyl isopropyl ether, vinyl chloroethyl ether, and dichlorodivinyl ether; cyclic unsaturated compounds such as styrene, chlorostyrenes, coumarone, indene, vinylnaphthalenes, vinylpyridines, and vinylpyrrole; acrylic acid and its derivatives such as ethyl acrylate, methyl methacrylate, ethyl methacrylate, ethyl chloroacrylate, acrylonitrile, and methacrylonitrile; dialkyl fumarates and maleates; unsaturated hydrocarbons such as ethylene, propylene, and isobutene; allyl compounds such as allyl acetate, allyl chloride, and allyl ethyl ether; and conjugated ethylenically-unsaturated compounds such as butadiene, isoprene, chloroprene, and divinyl ketone; and mixtures thereof. The copolymers that are most useful in the practice of this invention are those that contain at least 70% of vinyl halide units and up to 30% of comonomer units. The invention is also applicable to mixtures of polyvinyl halide resins in a major proportion with a minor proportion of another polymeric material such as polyethylene, polypropylene, polyacrylate and polymethacrylate esters, natural rubber, rubber hydrochloride and chlorinated rubber hydrochloride, synthetic rubber such as neoprene, silicone, nitrile, and SBR, polyurethanes, polyamides, polystyrene, phenol-formaldehyde resins, urea-formaldehyde resins, cellulose ethers and esters, and epoxy resins.

The polyvinyl halide resin compositions generally contain from about 10 parts to 150 parts by weight of the plasticizer system per 100 parts by weight of the polyvinyl halide resin. Products having a particularly advantageous combination of properties result when 30 parts to 60 parts by weight of plasticizer is used per 100 parts by weight of the polyvinyl halide resin.

In addition to the polyvinyl halide resin, biocidal solution, and plasticizers, the polyvinyl halide resin compositions may contain heat and light stabilizers, lubricants, pigments, dyes, extenders, and other resin additives in the amounts ordinarily used for the purposes indicated The resinous compounds are prepared by procedures that are known in the art. Calendered films may be prepared by blending the polyvinyl halide resin with the biocidal solution, plasticizers, and other ingredients at room temperature and then milling the mixture on a two-roll mill at from 300° to 400° F. for a time sufficient to form a homogeneous composition. The composition is then removed from the mill in the form of a sheet or film of the desired thickness, which may be used as such or subjected to a polishing or embossing treatment. Plastisol films may be prepared by mixing the ingredients together until a uniform composition is obtained, casting films of the desired thickness on glass plates, curing the films at about 325° to 375° F., and then stripping the films from the glass plates.

The invention is further illustrated by the following examples. In these examples, all parts are parts by weight and all percentages are percentages by weight.

EXAMPLE 1

Solutions that contained from 1.0% to 5.0% of N-trichloromethylthiophthalimide were prepared by mixing the appropriate amounts of N-trichloromethylthiophthalimide and solvent at room temperature, agitating the mixture and heating it at 100°–105° C. for 15–30 minutes and then adding 0.5% of diatomaceous earth (Celite 512) to the mixture before cooling it to 50°–60° C., and filtering it.

The stability of the resulting solutions was determined by storing portions of them at 6° C. and at 20–24° C. for 6 months or until an appreciable amount of the N-trichlomethylthiophthalimide had precipitated.

The solutions prepared and their stabilities at these temperatures are set forth in Table I.

The solutions that contained from 1% to 3% of N-trichloromethylthiophthalimide in diethylene glycol dibenzoate, dipropylene glycol dibenzoate, or mixtures of these benzoate esters remained clear and free from precipitate during the entire 6 month period at both test temperatures. Solutions that contained more than 3% of the biocide in these solvents were not completely clear at the end of the test period. Similarly, solutions that contained from 1.5–3.0% of the biocide in other solvents showed instability during the test.

TABLE I

| Ex. No. | Solvent | Concentration of biocide (percent) | Appearance of solution after storage for the indicated time at 6° C. | Appearance of solution after storage for the indicated time at 20–24° C. |
|---|---|---|---|---|
| 1a | Diethylene glycol dibenzoate | 2.0 | 6 mo., no precipitation | 6 mo., no precipitation. |
| 1b | do | 3.0 | do | Do. |
| 1c | do | 5.0 | 24 hrs., precipitation | 24 hrs., precipitation. |
| 1d | Dipropylene glycol dibenzoate | 1.0 | 6 mo., no precipitation | 6 mo., no precipitation. |
| 1e | do | 4.0 | 6 mo., slight precipitation | 6 mo., slight precipitation. |
| 1f | Diethylene glycol dibenzoate-dipropylene glycol dibenzoate (1:1 mixture). | 2.0 | 6 mo., no precipitation | 6 mo., no precipitation. |
| 1g | do | 3.0 | do | Do. |
| 1h | Diethylene glycol dibenzoate-dipropylene glycol dibenzoate (1:9 mixture). | 1.0 | do | Do. |
| 1i | do | 3.0 | do | Do. |
| 1j | Diethylene glycol dibenzoate-dipropylene glycol dibenzoate (9:1 mixture). | 1.5 | do | Do. |
| 1k | do | 2.5 | do | Do. |
| 1l | Diethylene glycol dibenzoate-epoxidized soybean oil (1:1 mixture) | 1.5 | 6 mo., slight precipitation | 6 mo., no precipitation. |
| 1m | do | 3.0 | 1 wk., precipitation | 3 wks., precipitation. |
| 1n | Epoxidized soybean oil | 1.5 | 2 wks., slight precipitation | 2 wks., slight precipitation. |
| 1o | Epoxidized tall oil | 1.5 | 1 wk., precipitation | 8 wks., precipitation. |
| 1p | Dioctyl phthalate | 3.0 | 24 hrs., precipitation | 24 hrs., precipitation. |
| 1q | Dibenzyl phthalate | 3.0 | 2 wks., precipitation | 12 wks., precipitation. |
| 1r | Butyl benzyl phthalate | 3.0 | do | 2 wks., precipitation. |
| 1s | Dibenzyl ether | 1.5 | 6 mo., slight precipitation | 6 mo., slight precipitation. |
| 1t | do | 3.0 | do | Do. |
| 1u | Diphenyl ether | 3.0 | 1 wk., precipitation | 8 wks., precipitation. |
| 1v | Mineral oil | 1.5 | 24 hrs., precipitation | 24 hrs., precipitation. |

EXAMPLE 2

(A) Polyvinyl chloride resin compositions were prepared using the formulations that are given in Table II. In each case, the ingredients were blended at room temperature, and the resulting mixtures were milled on a two-mill at 330°–340° F. for 5 minutes before formed into sheets that were 0.045 inch thick.

(B) The calendered sheets of Example 2A were evaluated by means of the following tests:

(1) Specimens that were cut from the calendered sheets were exposed to weathering in an Atlas Weather-Ometer (Model XW-2). The weathering exposure, which consisted of 102 minutes of ultraviolet light and 18 minutes of ultraviolet light and water spray, was continued for a total of 250 hours. Samples were removed after 50, 100, 150, 200, and 250 hours of weathering. Their antimicrobial activity was evaluated by means of determinations of zones of inhibition by the Agar Seed Plate Method and determinations of their resistance to surface fungal attack.

(2) The Agar Seed Plate Method was used to determine both antifungal activity and antibacterial activity. In the antifungal tests, Malt Agar which had been inoculated with the test organism was poured into plates. One inch squares of the sheets weathered by the procedure of Example 2B-1 were flash sterilized, placed on the surface of the hardened agar plates, and incubated at 30° C. for 3 to 7 days. The plates were then examined for zones of inhibited growth around the test squares. In the antibacterial tests, the seed agar was Trypticase-Glucose-Extract Agar, and the incubation period was 24 hours at 37° C.

The results obtained are summarized in Table III. In this table,

0=No zone of inhibition
Tr=Trace zone of inhibition
1–30=Size in millimeters of zone of inhibition (3) The resistance of the weathered films to surface fungal attack was determined by a modification of ASTM Method D 1924-63 (Determining Resistance of Plastics to Fungi) in which both single organisms and a mixed inoculum were used. The observations made after 3 weeks' incubation at 30° C. at 85–95% relative humidity are summarized in Table IV. In this table, 0=No growth on surface of film
1=Trace growth (<10%) on surface of film
2=Light growth (10–30%) on surface of film
3=Medium growth (30–60%) on surface of film
4=Heavy growth (60–100%) on surface of film The data in Table III demonstrate that the zones of inhibited growth shown by the compositions containing the biocidal solutions of this invention (Formulations A and C) were retained throughout the entire weathering period, whereas in the case of those that contained either powdered N - trichloromethylthiophthalimide (Formulations B and D) or the comparative biocide (Formulations E, F, and G) the zones of inhibition disappeared after 100–150 hours and 150–200 hours of weathering, respectively.

From the data in Table IV, it will be seen that all of the compositions containing N-trichloromethylthiophthalimide retained their resistance to surface fungal attack even after 250 hours weathering, while those that contained the comparative biocide had lost their surface fungal resistance after 100–150 hours' weathering.

TABLE II

| Ingredients | Formulation (parts) of— | | | | | | | | |
|---|---|---|---|---|---|---|---|---|---|
| | A | B | C | D | E | F | G | H | I |
| Polyvinyl chloride (Tenneco PVC 250) | 100.0 | 100.0 | 100.0 | 100.0 | 100.0 | 100.0 | 100.0 | 100.0 | 100.0 |
| Dioctyl phthalate | 33.75 | 44.8 | 22.5 | 44.5 | 27.5 | 44.9 | 41.6 | 23.0 | 45.0 |
| Dioctyl adipate | 10.0 | 10.0 | 10.0 | 10.0 | 10.0 | 10.0 | 10.0 | 10.0 | 10.0 |
| Epoxidized soybean oil | 5.0 | 5.0 | 5.0 | 5.0 | | | | 5.0 | 5.0 |
| Stearic acid | 0.5 | 0.5 | 0.5 | 0.5 | 0.5 | 0.5 | 0.5 | 0.5 | 0.5 |
| Ba/Cd/Zn stabilizer (Nuostabe V-1397) | 3.0 | 3.0 | 3.0 | 3.0 | 3.0 | 3.0 | 3.0 | 3.0 | 3.0 |
| Blue Pigment (20% in DOP) | 5.0 | 5.0 | 5.0 | 5.0 | 5.0 | 5.0 | 5.0 | 5.0 | 5.0 |
| Diethylene glycol dibenzoate | | | | | | | | 11.0 | |
| Dipropylene glycol dibenzoate | | | | | | | | | 11.0 |
| Solution containing 2% N-trichloromethylthiophthalimide in 1:1 diethylene glycol dibenzoate-dipropylene glycol dibenzoate mixture | 11.25 | | 22.5 | | | | | | |
| Powdered N-Trichloromethylthiophthalimide (100% active biocide) | | 0.225 | | 0.45 | | | | | |
| Solution containing 1% 10,10'-oxybisphenoxyarsine in epoxidized soybean oil (Vinyzene BP-5) | | | | | 0.37 | 0.085 | 0.140 | | |
| Active biocide (parts) per formula weight | 0.225 | 0.225 | 0.45 | 0.45 | 0.225 | 0.05 | 0.84 | | |
| Active biocide (parts) per total placticizer weight | 0.37 | 0.37 | 0.75 | 0.75 | 0.37 | 0.085 | 0.140 | | |
| Percent biocidal composition per formula weight | 6.88 | 0.133 | 13.76 | 0.26 | 13.4 | 3.0 | 5.0 | | |

TABLE III.—ANTIMICROBIAL ACTIVITY OF PLASTICIZED FILMS

| Test organisms | Weathering exposure (hours) | Vinyl formulation of— | | | | | | | | |
|---|---|---|---|---|---|---|---|---|---|---|
| | | A | B | C | D | E | F | G | H | I |
| Bacteria: | | | | | | | | | | |
| Bacillus subtilis | 0 | 1 | 0 | 2 | Tr | 7 | 5 | 5 | 0 | 0 |
| | 50 | Tr | 0 | 2 | Tr | 5 | 3 | 4 | 0 | 0 |
| | 100 | Tr | 0 | 1 | 0 | 3 | 1 | 2 | 0 | 0 |
| | 150 | Tr | 0 | 1 | 0 | Tr | 0 | 0 | 0 | 0 |
| | 200 | Tr | 0 | Tr | 0 | 0 | 0 | 0 | 0 | 0 |
| | 250 | 0 | 0 | Tr | 0 | 0 | 0 | 0 | 0 | 0 |
| Staphylococcus aureus | 0 | Tr | Tr | 2 | Tr | 6 | 3 | 5 | 0 | 0 |
| | 50 | Tr | Tr | 2 | Tr | 3 | 0 | 2 | 0 | 0 |
| | 100 | Tr | 0 | 2 | Tr | 1 | 0 | Tr | 0 | 0 |
| | 150 | Tr | 0 | 2 | 0 | Tr | 0 | 0 | 0 | 0 |
| | 200 | Tr | 0 | 1 | 0 | 0 | 0 | 0 | 0 | 0 |
| | 250 | 0 | 0 | Tr | 0 | 0 | 0 | 0 | 0 | 0 |
| Pseudomonas aeruginosa | 0 | 0 | 0 | 0 | 0 | 0 | 0 | 0 | 0 | 0 |
| | 50 | 0 | 0 | 0 | 0 | 0 | 0 | 0 | 0 | 0 |
| | 100 | 0 | 0 | 0 | 0 | 0 | 0 | 0 | 0 | 0 |
| | 150 | 0 | 0 | 0 | 0 | 0 | 0 | 0 | 0 | 0 |
| | 200 | 0 | 0 | 0 | 0 | 0 | 0 | 0 | 0 | 0 |
| | 250 | 0 | 0 | 0 | 0 | 0 | 0 | 0 | 0 | 0 |
| Brevibacterium sp | 0 | 6 | 6 | 10 | 8 | 30 | 24 | 25 | 0 | 0 |
| | 50 | 6 | 5 | 8 | 7 | 20 | 15 | 20 | 0 | 0 |
| | 100 | 6 | 4 | 8 | 9 | 10 | 11 | 10 | 0 | 0 |
| | 150 | 6 | 2 | 6 | 8 | 0 | 3 | 2 | 0 | 0 |
| | 200 | 6 | 2 | 7 | 7 | 0 | 0 | 0 | 0 | 0 |
| | 250 | 5 | 2 | 6 | 6 | 0 | 0 | 0 | 0 | 0 |
| Fungi: | | | | | | | | | | |
| Aspergillus niger | 0 | 0 | 0 | 0 | 0 | 10 | 5 | 10 | 0 | 0 |
| | 50 | 0 | 0 | 0 | 0 | 5 | 2 | 3 | 0 | 0 |
| | 100 | 0 | 0 | 0 | 0 | 1 | 0 | Tr | 0 | 0 |
| | 150 | 0 | 0 | 0 | 0 | 0 | 0 | 90 | 0 | 0 |
| | 200 | 0 | 0 | 0 | 0 | 0 | 0 | 0 | 0 | 0 |
| | 250 | 0 | 0 | 0 | 0 | 0 | 0 | 0 | 0 | 0 |
| Penicillium funiculosum | 0 | 3 | 2 | 6 | 3 | 14 | 10 | 11 | 0 | 0 |
| | 50 | 2 | 0 | 5 | 2 | 0 | 5 | 7 | 0 | 0 |
| | 100 | 2 | 0 | 4 | 1 | 2 | 1 | 1 | 0 | 0 |
| | 150 | 1 | 0 | 4 | 1 | Tr | 0 | 0 | 0 | 0 |
| | 200 | 1 | 0 | 4 | 0 | 0 | 0 | 0 | 0 | 0 |
| | 250 | 1 | 0 | 3 | 0 | 0 | 0 | 0 | 0 | 0 |
| Penicillium islandicum | 0 | 2 | Tr | 3 | 3 | 15 | 12 | 13 | 0 | 0 |
| | 50 | 2 | Tr | 3 | 3 | 10 | 8 | 10 | 0 | 0 |
| | 100 | 1 | 0 | 3 | 2 | 6 | 2 | 3 | 0 | 0 |
| | 150 | Tr | 0 | 3 | 1 | Tr | Tr | Tr | 0 | 0 |
| | 200 | Tr | 0 | 2 | 0 | 0 | 0 | 0 | 0 | 0 |
| | 250 | Tr | 0 | 2 | 0 | 0 | 0 | 0 | 0 | 0 |
| Chaetomium globosum | 0 | 0 | 3 | 3 | Tr | 16 | 14 | 13 | 0 | 0 |
| | 50 | 0 | 3 | 3 | Tr | 10 | 9 | 8 | 0 | 0 |
| | 100 | 0 | 2 | 3 | Tr | 5 | 2 | 2 | 0 | 0 |
| | 150 | 0 | 2 | 2 | 0 | Tr | 90 | Tr | 0 | 0 |
| | 200 | 0 | 2 | 2 | 0 | 0 | 0 | 0 | 0 | 0 |
| | 250 | 0 | 1 | 2 | 0 | 0 | 0 | 0 | 0 | 0 |
| Active Biocide (parts) per total plasticizer weight | | 0.37 | 0.37 | 0.75 | 0.75 | 0.37 | 0.085 | 0.140 | | |

TABLE IV.—RESISTANCE OF PLASTICIZED FILMS TO SURFACE FUNGAL ATTACK

| Test organisms | Weathering exposure (hours) | Vinyl formulation of— | | | | | | | | |
|---|---|---|---|---|---|---|---|---|---|---|
| | | A | B | C | D | E | F | G | H | I |
| Aspergillus niger | 0 | 0 | 0 | 0 | 0 | 0 | 0 | 0 | 2 | 2-3 |
| | 50 | 0 | 0 | 0 | 0 | 0 | 0 | 0 | 2 | 2-3 |
| | 100 | 0 | 0 | 0 | 0 | 0 | 0 | 0 | 2 | 2-3 |
| | 150 | 0 | 0 | 0 | 0 | 0 | 1 | Tr | 2 | 2-3 |
| | 200 | 0 | 0 | 0 | 0 | 2 | 2 | 1-2 | 2 | 2-3 |
| | 250 | 0 | 0 | 0 | 0 | 4 | 3 | 2 | 2 | 3 |
| Penicillium funiculosum | 0 | 0 | 1 | 0 | 0 | 0 | 0 | 0 | 4 | 4 |
| | 50 | 0 | 1 | 0 | 0 | 0 | 0 | 0 | 4 | 4 |
| | 100 | 0 | 1 | 0 | 0 | 0 | 0 | 0 | 4 | 4 |
| | 150 | 0 | 1 | 0 | 0 | 0 | 1 | 1 | 4 | 4 |
| | 200 | 0-1 | 1 | 0 | 0 | 2 | 2-3 | 2 | 4 | 4 |
| | 250 | 0-1 | 1 | 0 | 0 | 3-4 | 4 | 3-4 | 4 | 4 |
| Penicillium islandicum | 0 | 0 | 0 | 0 | 0 | 0 | 0 | 0 | 4 | 4 |
| | 50 | 0 | 0 | 0 | 0 | 0 | 0 | 0 | 4 | 4 |
| | 100 | 0 | 0 | 0 | 0 | 0 | 0 | 0 | 4 | 4 |
| | 150 | 0 | 0 | 0 | 0 | 0 | 0-1 | 0-1 | 4 | 4 |
| | 200 | 0 | 0 | 0 | 0 | 3 | 2 | 2-3 | 4 | 4 |
| | 250 | 0 | 0 | 0 | 0 | 4 | 4 | 3-4 | 4 | 4 |
| Chaetonium globosum | 0 | 0 | 0 | 0 | 0 | 0 | 0 | 0 | 1-2 | 2 |
| | 50 | 0 | 0 | 0 | 0 | 0 | 0 | 0 | 1-2 | 2 |
| | 100 | 0 | 0 | 0 | 0 | 0 | 0 | 0 | 1-2 | 2 |
| | 150 | 0 | 0 | 0 | 0 | 0 | 0-1 | 0 | 1-2 | 3 |
| | 200 | 0 | 0 | 0 | 0 | 1-2 | 1 | 1-2 | 2 | 3 |
| | 250 | 0 | 0 | 0 | 0 | 2-3 | 1-2 | 1-2 | 2 | 3 |
| Mixed inoculum (equal mixture of A. niger, P. funiculosum, P. islandicum, and Ch. globosum) | 0 | 0 | 1 | 0 | 0 | 0 | 0 | 0 | 4 | 4 |
| | 50 | 0 | 1 | 0 | 0 | 0 | 0 | 0 | 4 | 4 |
| | 100 | 0 | 1 | 0 | 0 | 0 | 0 | 0 | 4 | 4 |
| | 150 | 0 | 1 | 0 | 0 | 0-1 | 2 | 1-2 | 4 | 4 |
| | 200 | 0 | 1 | 0 | 0-1 | 1-2 | 3 | 2 | 4 | 4 |
| | 250 | 0-1 | 1 | 0 | 1 | 3-4 | 4 | 3-4 | 4 | 4 |
| Active biocide (parts) per total plasticizer weight | | 0.37 | 0.37 | 0.75 | 0.75 | 0.37 | 0.085 | 0.140 | | |

EXAMPLE 3

A series of polyvinyl chloride resin compositions was prepared using the formulations given in Table V.

The compositions were prepared by blending the ingredients at room temperature and milling the resulting mixtures on a two-roll mill at 330°–340° F. for 5 minutes before forming them into sheets that were 0.045 inch thick. The compositions were evaluated by the procedures described in Example 2B. The results obtained are summarized in Table VI. In this table, 0 = No zone of inhibition
Tr = Trace zone of inhibition
1–20 = Size in millimeters of zone of inhibition.

From the data in Table VI, it will be seen that the compositions containing the antimicrobial solution of this invention (Formulations J and K) had excellent antifungal and antibacterial properties after exposure to weathering for 200–250 hours, whereas the compositions that contained powdered N-trichloromethylthiophthalimide (Formulations L and M) and those that contained the comparative biocide (Formulations N and O) had lost a substantial amount of their antimicrobial activity after exposure to weathering for 100–150 hours and 100 hours, respectively.

TABLE V

| Ingredients | Formulation (parts) of— | | | | | | |
|---|---|---|---|---|---|---|---|
| | J | K | L | M | N | O | P |
| Polyvinyl chloride | 100 | 100 | 100 | 100 | 100 | 100 | 100 |
| Dioctyl phthalate | 15 | 15 | 15 | 15 | 15 | 9 | 15 |
| Dioctyl sebacate | 30 | 30 | 30 | 30 | 30 | 30 | 30 |
| Epoxidized soybean oil | 7.5 | | 14.8 | 14.5 | 3 | | 15 |
| Stearic acid | 0.5 | 0.5 | 0.5 | 0.5 | 0.5 | 0.5 | 0.5 |
| Ba/Cd/Zn stabilizer (Nuostabe V-1397) | 3.0 | 3.0 | 3.0 | 3.0 | 3.0 | 3.0 | 3.0 |
| Solution containing 3% N-trichloromethylthiophthalimide in diethylene glycol dibenzoate | 7.5 | 15.0 | | | | | |
| Powdered N-trichloromethylthiophthalimide (100% active biocide) | | | 0.22 | 0.45 | | | |
| Solution containing 1% 10,10′-Oxybisphenoxarsine in epoxidized soybean oil (Vinyzene BP-5) | | | | | 12.0 | 22.5 | |
| Active biocide (parts) per total plasticizer weight | 0.37 | 0.75 | 0.37 | 0.75 | 0.20 | 0.37 | |

EXAMPLE 4

(A) The plastisol formulations shown in Table VII were compounded in a Hobart mixer. The resulting compositions were cast on a glass plate to form films that were 0.020 inch thick. After curing at 350° F. for five minutes and cooling, the films were stripped from the glass plates.

(B) Specimens of the plastisol films were exposed to weathering in an Atlas Weather-Ometer (Model XW-2). The weathering exposure, which consisted of repeated cycles of 102 minutes of ultraviolet light and 18 minutes of ultraviolet light and water spray, was continued for a total of 250 hours. The samples were examined for surface spewing, powder deposits, and discoloration every 50 hours. After 200 hours' exposure, Formulation U showed slight yellowing. After 250 hours' exposure, none of the samples showed surface exudation or powder deposits, Formulations Q, R, S, T, V, and W had yellowed slightly, and Formulation U and yellowed moderately.

TABLE VI.—ANTIMICROBIAL ACTIVITY OF PLASTICIZED FILMS

| Test organisms | Weathering exposure (hours) | Vinyl formulation of— | | | | | |
|---|---|---|---|---|---|---|---|
| | | J | K | L | M | N | O | P |
| Bacteria: | | | | | | | | |
| Bacillus subtilis | 0 | 4 | 3 | 4 | 4 | 8 | 9 | Tr |
| | 100 | 1 | 2 | 1 | 4 | 0 | 0 | 0 |
| | 150 | 2 | 2 | 0.5 | 3 | 0 | 0 | 0 |
| | 200 | 1 | 1 | 0 | 2 | 0 | 0 | 0 |
| | 250 | 3 | 1 | 0 | 0.5 | 0 | 0 | 0 |
| Staphylococcus aureus | 0 | 0.5 | 0 | 0 | Tr | 5 | 6 | 0 |
| | 100 | Tr | 0 | 0 | 0 | 0 | 0 | 0 |
| | 150 | Tr | 0 | 0 | 0 | 0 | 0 | 0 |
| | 200 | Tr | 0 | 0 | 0 | 0 | 0 | 0 |
| | 250 | Tr | 0 | 0 | 0 | 0 | 0 | 0 |
| Pseudomonas aeruginosa | 0 | 0 | 0 | 0 | 0 | 12 | 13 | 0 |
| | 100 | 0 | 0 | 0 | 0 | 0 | 0 | 0 |
| | 150 | 0 | 0 | 0 | 0 | 0 | 0 | 0 |
| | 200 | 0 | 0 | 0 | 0 | 0 | 0 | 0 |
| | 250 | 0 | 0 | 0 | 0 | 0 | 0 | 0 |
| Brevibacterium sp | 0 | 5 | 4 | 4 | 5 | 15 | 17 | 0 |
| | 100 | 4 | 4 | 3 | 4 | 0 | 0 | 0 |
| | 150 | 4 | 3 | 3 | 4 | 0 | 0 | 0 |
| | 200 | 4 | 3 | 3 | 4 | 0 | 0 | 0 |
| | 250 | 4 | 3 | 2 | 4 | 0 | 0 | 0 |
| Fungi: | | | | | | | | |
| Aspergillus niger | 0 | Tr | Tr | Tr | Tr | 10 | 11 | 0 |
| | 100 | Tr | 0 | 0 | Tr | 0 | 0 | 0 |
| | 150 | 0 | 0 | 0 | 0 | 0 | 0 | 0 |
| | 200 | 0 | 0 | 0 | 0 | 0 | 0 | 0 |
| | 250 | 0 | 0 | 0 | 0 | 0 | 0 | 0 |
| Penicillium funiculosum | 0 | 4 | 2 | 2 | 3 | 18 | 20 | 0 |
| | 100 | 3 | 1 | 1 | 2 | 0 | 0 | 0 |
| | 150 | 2 | 1 | 0.5 | 2 | 0 | 0 | 0 |
| | 200 | 2 | 0.5 | 0 | 0.5 | 0 | 0 | 0 |
| | 250 | 2 | Tr | 0 | 0 | 0 | 0 | 0 |
| Penicillium islandicum | 0 | 4 | 2 | 2 | 4 | 15 | 17 | 0 |
| | 100 | 3 | 1 | 1 | 2 | 0 | 0 | 0 |
| | 150 | 3 | 1 | 0.5 | 1 | 0 | 0 | 0 |
| | 200 | 2 | 0.5 | 0 | 0.5 | 0 | 0 | 0 |
| | 250 | 2 | 0.5 | 0 | 0 | 0 | 0 | 0 |
| Chaetonium globosum | 0 | 9 | 5 | 3 | 5 | 17 | 19 | 0 |
| | 100 | 7 | 4 | 3 | 5 | 0 | 0 | 0 |
| | 150 | 4 | 3 | 2 | 4 | 0 | 0 | 0 |
| | 200 | 4 | 3 | 2 | 2 | 0 | 0 | 0 |
| | 250 | 4 | 3 | 0.5 | 1 | 0 | 0 | 0 |

TABLE VII

| Ingredients | Formulation of— | | | | | | | | |
|---|---|---|---|---|---|---|---|---|---|
| | Q | R | S | T | U | V | W | X | Y |
| Polyvinyl chloride | 100.0 | 100.0 | 100.0 | 100.0 | 100.0 | 100.0 | 100.0 | 100.0 | 100.0 |
| Dioctyl phthalate | 38.75 | 49.8 | 27.5 | 49.5 | 32.5 | 49.9 | 46.6 | 25.0 | 50.0 |
| Dioctyl adipate | 10.0 | 10.0 | 10.0 | 10.0 | 10.0 | 10.0 | 10.0 | 10.0 | 10.0 |
| Epoxidized soybean oil | 5.0 | 5.0 | 5.0 | 5.0 | | | | 5.0 | 5.0 |
| Ba/Cd/Zn stabilizer (Nuostabe V-1515) | 3.0 | 3.0 | 3.0 | 3.0 | 3.0 | 3.0 | 3.0 | | |
| Diethylene glycol dibenzoate | | | | | | | | 11.0 | |
| Dipropylene glycol dibenzoate | | | | | | | | 11.0 | |
| Solution containing 2% N-trichloromethylthiophthalimide in 1:1 diethylene glycol dibenzoate-dipropylene glycol dibenzoate mixture | 11.25 | | 22.5 | | | | | | |
| Powdered N-trichloromethylthiophthalimide (100% active biocide) | | 0.225 | | 0.45 | | | | | |
| Solution containing 1% 10,10′-oxybisphenoxarsine in epoxidized soybean oil (Vinyzene BR-5) | | | | | 22.5 | 5.1 | 8.4 | | |
| Active Biocide (parts) per part formula weight | 0.225 | 0.225 | 0.45 | 0.45 | 0.225 | 0.051 | 0.084 | | |
| Active biocide (parts) per total plasticizer weight | 0.37 | 0.37 | 0.75 | 0.75 | 0.37 | 0.085 | 0.140 | | |
| Percent biocidal composition per formula weight | 6.88 | 0.133 | 13.76 | 0.26 | 13.4 | 3.0 | 5.0 | | |

What is claimed is:

1. The method of controlling the growth of fungi and bacteria in polyvinyl halide resin compositions that comprises incorporating in said compositions a biocidally-effective amount of a biocidal solution that contains from about 1% to 3% by weight of N-trichloromethylthiophthalimide in a polyalkylene glycol dibenzoate solvent selected from the group consisting of diethylene glycol dibenzoate, dipropylene glycol dibenzoate, and mixtures thereof.

2. The method of Claim 1 wherein the biocidal solution contains from 1.5% to 2.5% by weight of N-trichloromethylthiophthalimide.

3. The method of Claim 1 wherein the polyalkylene glycol dibenzoate solvent comprises diethylene glycol dibenzoate.

4. The method of Claim 1 wherein the biocidal solution contains about 2% of N-trichloromethylthiophthalimide in a solvent that contains about 50% of diethylene glycol dibenzoate and 50% of dipropylene glycol dibenzoate.

5. The method of Claim 1 wherein the polyvinyl halide resin is polyvinyl chloride.

6. The method of Claim 1 wherein the polyvinyl halide resin composition contains 10% to 150%, based on the weight of polyvinyl halide, of a plasticizer selected from the group consisting of dialkyl phthalates, aryl alkyl phthalates, dialkyl sebacates, dialkyl adipates, dialkyl azelates, polyalkylene glycol dibenzoates, polyalkylene glycol di-(chlorobenzoates), citrates, epoxidized vegetable oils, phosphate esters, chlorinated paraffins, and mixtures thereof.

7. The method of Claim 6 wherein the polyvinyl halide resin composition contains 30% to 60%, based on the weight of polyvinyl halide, of said plasticizer.

8. The method of Claim 6 wherein the amount of the biocidal solution that is incorporated into the polyvinyl halide resin composition is that which will provide from 0.10 part to 1.0 part of N-trichloromethylthiophthalimide per 100 parts of plasticizer in the composition.

9. The method of Claim 6 wherein the amount of the biocidal solution that is incorporated into the polyvinyl halide resin composition is that which will provide 0.25 part to 0.75 part of N-trichloromethylthiophthalimide per 100 parts of plasticizer in the composition.

10. The method of Claim 1 wherein the polyalkylene glycol dibenzoate solvent contains 10% to 90% by weight of diethylene glycol dibenzoate and 10% to 90% by weight of dipropylene glycol dibenzoate.

References Cited

UNITED STATES PATENTS 2,553,770  5/1951  Kittleson ---------- 424—270

OTHER REFERENCES

Polymer Engineering & Science, Kaplan et al., July 1970, pp. 241–246 relied on.

Stabilization of Polymers & Stabilizers Processes, Gould et al., 1968, pp. 250–270 relied on.

MAURICE J. WELSH, Primary Examiner

W. E. PARKER, Assistant Examiner

U.S. Cl. X.R.

260—45.8 N, 326; 424—78, 274